(12) United States Patent
Sugiyama et al.

(10) Patent No.: US 7,165,517 B2
(45) Date of Patent: Jan. 23, 2007

(54) CONTROL APPARATUS AND METHOD FOR INTERNAL COMBUSTION ENGINE WITH VARIABLE COMPRESSION RATIO MECHANISM

(75) Inventors: Takanobu Sugiyama, Yokohama (JP); Shinichi Takemura, Yokohama (JP); Toru Noda, Yokohama (JP); Ryosuke Hiyoshi, Kanagawa (JP); Shunichi Aoyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/934,368

(22) Filed: Sep. 7, 2004

(65) Prior Publication Data

US 2005/0056240 A1    Mar. 17, 2005

(30) Foreign Application Priority Data

Sep. 16, 2003    (JP)    ............................. 2003-323093

(51) Int. Cl.
*F02B 75/04* (2006.01)
*F02P 5/00* (2006.01)

(52) U.S. Cl. .............. 123/48 R; 123/78 R; 123/406.33

(58) Field of Classification Search .............. 123/48 R, 123/48 A, 48 B, 78 R, 78 A, 78 F, 406.29, 123/406.33
See application file for complete search history.

(56) References Cited

U.S. PATENT DOCUMENTS

| | | | |
|---|---|---|---|
| 4,700,677 A | * | 10/1987 | Bonitz et al. .......... 123/406.33 |
| 4,860,711 A | | 8/1989 | Morikawa |
| 6,553,949 B1 | | 4/2003 | Kolmanovsky et al. |

FOREIGN PATENT DOCUMENTS

| | | |
|---|---|---|
| JP | 59-188056 A | 10/1984 |
| JP | 63-109282 A | 5/1988 |
| JP | 4-047166 A | 2/1992 |
| JP | 5-39770 A | 2/1993 |
| JP | 2001-263114 A | 9/2001 |
| JP | 2001-280228 A | 10/2001 |

* cited by examiner

*Primary Examiner*—Noah P. Kamen
(74) *Attorney, Agent, or Firm*—Foley & Lardner LLP

(57) ABSTRACT

A control apparatus for an internal combustion engine includes a variable compression ratio mechanism capable of varying a compression ratio of the engine, a compression ratio setting section that sets a compression ratio to be attained by the variable compression ratio mechanism in accordance with an operating condition of the engine, a knock detecting section that detects a knock occurrence state, an ignition timing learning correcting section that determines a learning correction value of an ignition timing in accordance with the knock occurrence sate, and a compression ratio correcting section that corrects the compression ratio set by the compression ratio setting section in accordance with the learning correction value of the ignition timing. A control method is also provided.

23 Claims, 13 Drawing Sheets

HIGH COMPRESSION RATIO POSITION

LOW COMPRESSION RATIO POSITION

CONTROL APPARATUS AND METHOD FOR INTERNAL COMBUSTION ENGINE WITH VARIABLE COMPRESSION RATIO MECHANISM

BACKGROUND OF THE INVENTION

The present invention relates to a control apparatus and method for an internal combustion engine having a variable compression ratio mechanism.

A typical conventional ignition timing control system for an internal combustion engine is adapted to determine an ignition timing in accordance with engine speed and load.

In contrast to this, it is proposed, as disclosed in Unexamined Japanese Patent Publication No. 2001-280228, to optimize an ignition timing with consideration of valve timing. This is for taking into account decrease in combustion speed that is caused when a variable valve operating mechanism is used to perform a so-called non-throttle operation or when an internal EGR ratio (remaining gas ratio) is controlled by valve overlap. Namely, in such a non-throttle operation, decrease in combustion speed is caused when a set intake valve closing timing is advanced to decrease an effective compression ratio. Further, in such an internal EGR ratio control by valve overlap, decrease in combustion speed is caused by an increased portion of an internal EGR ratio.

On the other hand, it is proposed, as disclosed in Unexamined Japanese Patent Publication No. 2001-263114, a multi-link type variable compression ratio mechanism capable of varying a compression ratio by using a plurality of link mechanisms.

In such an internal combustion engine having a variable compression ratio mechanism, it is desirable to optimize an ignition timing in accordance with a set compression ratio similarly to the case the engine is provided with the variable valve operating mechanism.

Namely, it is desirable to perform basic setting of the ignition timing in accordance with a compression ratio (specifically, an angle of a control shaft that controls the compression ratio) that is set every combustion cycle in addition to engine speed and load.

Further, there is a technique for controlling an ignition timing in accordance with knock of the engine detected by a knock sensor. Namely, an ignition timing is controlled so as to advance from a basic ignition timing until knock of the engine is detected, and upon detection of knock the ignition timing is controlled so as to retard by an amount determined based on a frequency and magnitude of knock. In the meantime, the ignition timing control described above is performed when the engine is in an operating range in which noise added to sensor outputs is relatively small (mainly in an operating range of middle speed or lower) and in an operating range of middle load or lower in which there is a possibility of occurrence of knock. In an operating range in which engine speed is higher than middle speed, an ignition timing correction value obtained in an operating range in which the ignition timing control is performed is used as an estimation value. Further, it has been proposed to learn an ignition timing correction value in accordance with occurrence of knock (knock correction value) and control the ignition timing based upon the learned correction value. An example of an ignition timing learning control is disclosed by Unexamined Japanese Patent Application No. 5-039770. Namely, in the ignition timing learning control, an ignition timing correction value (knock correction value) is learned depending upon whether or not the engine is knocking and an ignition timing is controlled depending upon the learned correction value. Together with such an ignition timing learning control, learning of an ignition timing correction value is stopped during a predetermined number of ignition at the time of judgment of acceleration, thus realizing assured ignition timing correction based on knock of the engine.

SUMMARY OF THE INVENTION

In a spark ignition type internal combustion engine having a variable compression ratio mechanism, a basic control of ignition can be attained by performing a basic ignition timing control in accordance with an actual compression ratio and the above-described knock control. Further, by performing an ignition timing learning control, it becomes possible, in each operating range of the engine, to prevent deviation of the ignition timing from an optimum value and attain optimum setting of the ignition timing.

However, it is heretofore known that an anti-knock property of an engine is lowered due to aged deterioration such as deposit. In the above-described control, the ignition timing is changed so as to prevent occurrence of knock thereby maintaining a good operation of the engine. In this instance, retardation of the ignition timing is increased gradually, thus causing a problem that the performance efficiency of the engine is inevitably lowered.

In this connection, if a spark ignition type internal combustion engine has a variable compression ratio mechanism, it becomes possible to absorb an aged deterioration of the engine and a variation of the individual engine itself by changing a set compression ratio every operating condition of the engine in place of correction of the ignition timing. As compared with the case correction is made by the ignition timing, it becomes possible to avoid knock of the engine while improving the fuel consumption of the engine by selecting a compression ratio that allows the ignition timing to go closer to an optimum value.

It is accordingly an object of the present invention to provide a control apparatus for an internal combustion engine having a variable compression control mechanism which can realize a set compression ratio correction in accordance with an aged deterioration of the engine thereby avoiding knock while improving a fuel consumption.

To achieve the above object, there is provided according to an aspect of the present invention a control apparatus for an internal combustion engine comprising a variable compression ratio mechanism capable of varying a compression ratio of the engine, a knock sensor for detecting a knock occurrence sate, and a controller for controlling the compression ratio and an ignition timing of the engine, the controller including a compression ratio setting section that sets a compression ratio to be attained by the variable compression ratio mechanism in accordance with an operating condition of the engine, an ignition timing learning correcting section that determines a learning correction value of an ignition timing in accordance with the knock occurrence sate, and a compression ratio correcting section that corrects the compression ratio set by the compression ratio setting section in accordance with the learning correction value of the ignition timing.

According to another aspect of the present invention, there is provided a control method for an internal combustion engine having a variable compression ratio mechanism capable of varying a compression ratio of the engine, comprising setting a compression ratio to be attained by the variable compression ratio mechanism in accordance with an operating condition of the engine, detecting a knock occurrence state, determining a learning correction value of an ignition timing in accordance with the knock occurrence sate, and correcting the compression ratio set by the compression ratio setting section in accordance with the learning correction value of the ignition timing.

DESCRIPTION OF THE PREFERRED EMBODIMENTS

Figure 1:
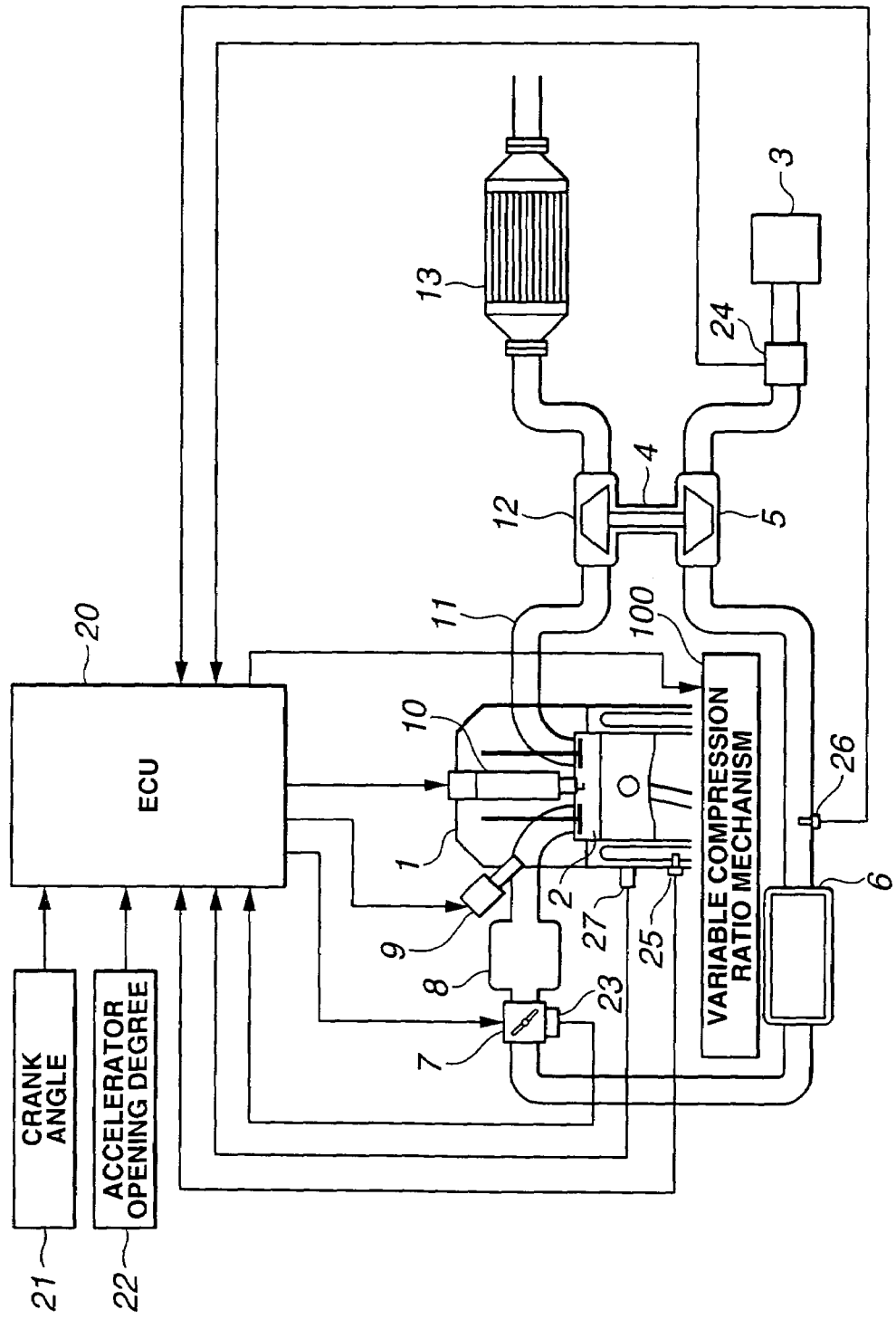
FIG. 1 is a schematic view of a control apparatus for a vehicular internal combustion engine.

Referring first to FIG. 1, air is drawn from air cleaner 3 in an intake system into combustion chamber 2 of each cylinder of engine 1 through intake compressor 5 of super charger 4, intercooler 6, electronically controlled throttle valve 7 and intake manifold 8. A fuel supply system includes fuel injector 9 capable of injecting fuel that has been regulated to a predetermined pressure, directly into a branch portion of intake manifold 8 (or directly into combustion chamber 2) for each cylinder. Fuel is injected at a predetermined timing for each cylinder and ignited by spark plug 10 so as to burn within combustion chamber 2. After burning, an exhaust gas is emitted through exhaust manifold 11 in an exhaust system, exhaust turbine of super chamber 4 and exhaust purifying catalyst 13.

Electronically controlled throttle valve 7 and fuel injector 9 are controlled by engine control unit (hereinafter referred to as ECU) 20.

For this sake, inputted to ECU 20 are signals from crank angle sensor 21 for producing a crank angle signal having a timed relation to engine speed and thereby capable of detecting engine speed Ne, accelerator opening degree sensor 22 for detecting accelerator opening degree (accelerator pedal depression amount) APO, throttle opening degree sensor 23 for detecting opening degree TVO of throttle valve 7, airflow meter 24 for detecting intake air quantity Qa, water temperature sensor 25 for detecting engine cooling water temperature Tw, intake air temperature sensor 26 for detecting intake air temperature Ta, and knock sensor 27 for detecting from vibrations of engine 1 a vibration level of knock of a particular frequency component to serve as a knock detecting means.

Herein, in ECU 20, target throttle opening degree tTVO is usually set based on accelerator opening degree APO. The opening degree of electronically controlled throttle valve 7 is controlled so that target throttle opening degree tTVO is obtained.

Further, from intake air quantity Qa and engine speed Ne is calculated basic fuel injection quantity $Tp=K \times Qa/Ne$ (K is constant) which is then corrected by various correction coefficients COEF to calculate final fuel injection quantity $Ti=Tp \times COEF$. Then, a fuel injection pulse signal of a pulse width corresponding to Ti is outputted to fuel injector 9 for each cylinder at a predetermined timing thereby performing fuel injection.

Further, mainly based on engine speed Ne and load Te (e.g., intake air quantity Qa, basic fuel injection quantity Tp, accelerator opening degree APO, throttle opening degree TVO) is set basic ignition timing MADV which is then subjected to correction according to a knock occurrence state detected by knock sensor 27 for thereby determining final ignition timing ADV and making spark plug 10 carry out ignition at ignition timing ADV.

Further, engine 1 includes variable compression ratio mechanism 100 which will be described with reference to FIG. 2.

Figure 2:
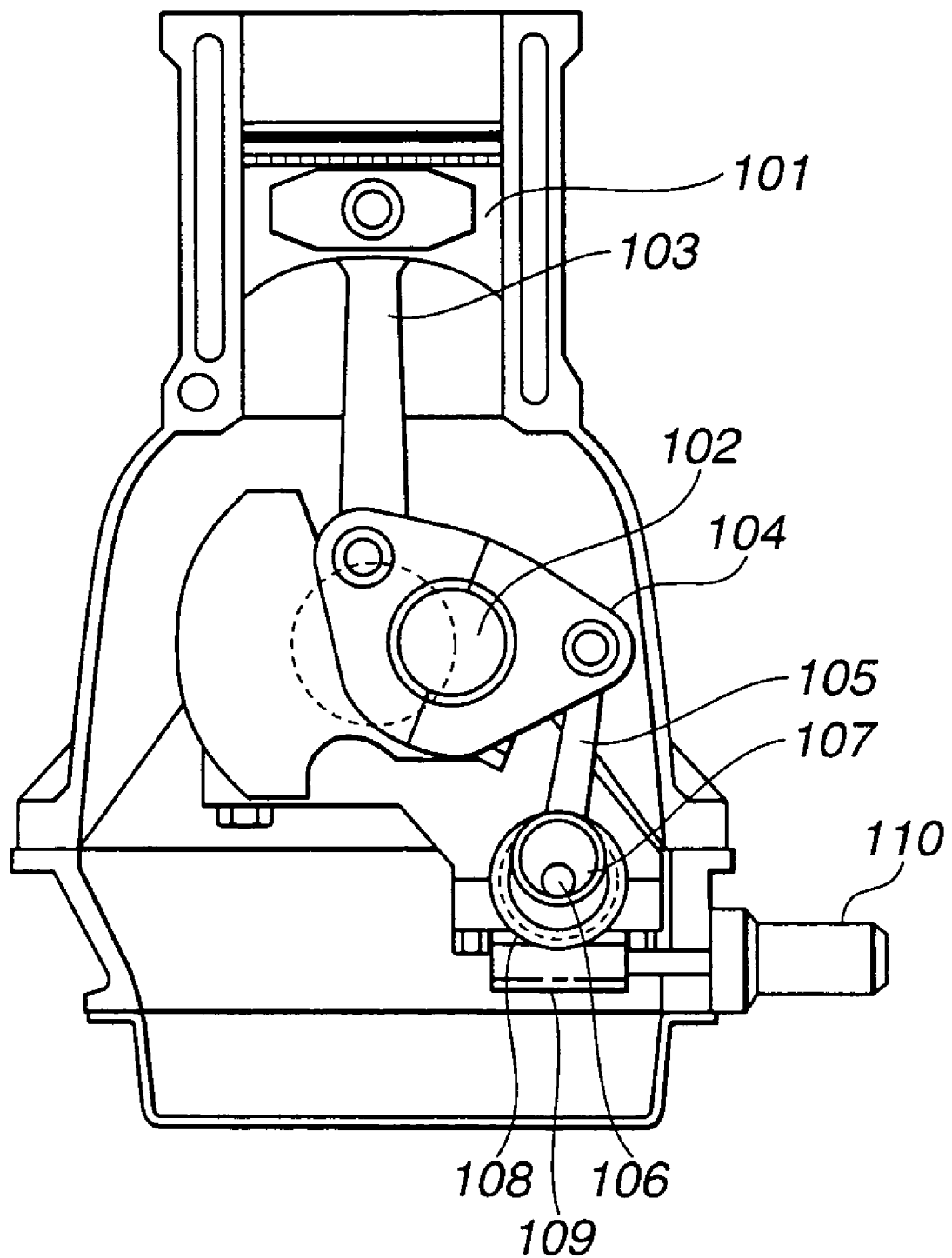
FIG. 2 is a schematic view of a variable compression ratio mechanism employed in the engine of FIG. 1.

In FIG. 2, variable compression ratio mechanism 100 is shown as a double-link type and differs from a usual crank mechanism in that piston 101 and crank (crank pin) 102 are connected by way of two links, i.e., first link 103 and second link 104. To second link 104 is connected an end of third link 105. The other end (support portion) of third link 105 is attached to eccentric cam 107 provided eccentrically to control shaft 106 which is in turn rotatably mounted on an engine main body (no numeral). To control shaft 106 is fixedly attached worm wheel 108 meshed with worm 109 which is in turn fixedly attached to an output shaft of actuator (motor) 110. Accordingly, rotation of control shaft 106 by means of actuator 110 causes the central position of eccentric cam 107 to be changed thereby changing the position of the other end (support portion) of third link 105, thus making it possible to change the top dead center position of piston 101.

Figure 3A:
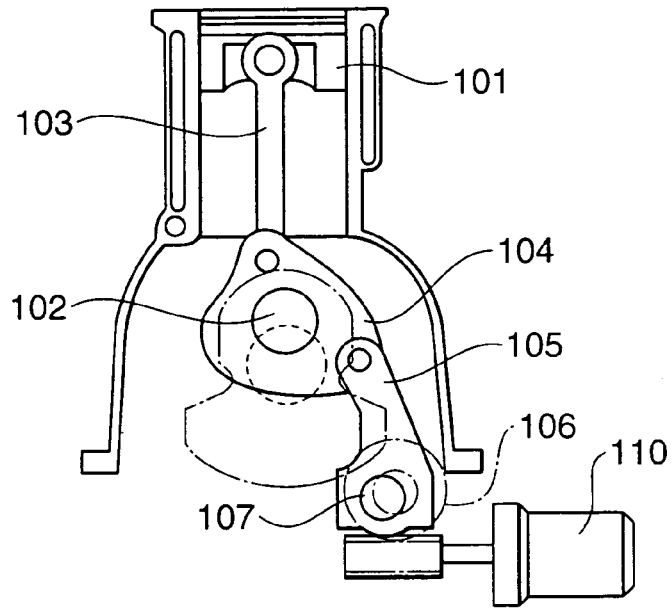
FIGS. 3A and 3B are schematic views showing the variable compression ratio mechanism of FIG. 2 in a high compression ratio position and a low compression ratio position, respectively.
Figure 3B:
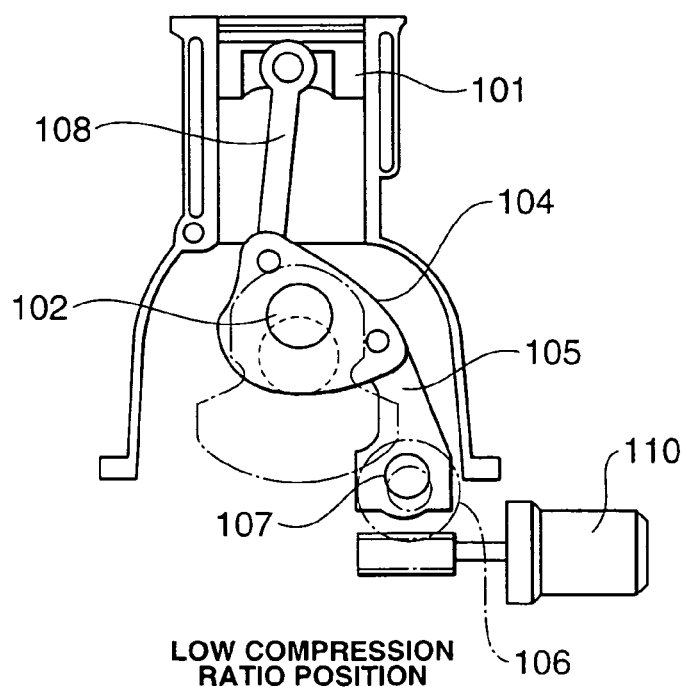

The largest feature of the mechanism resides in that the uppermost position of piston 101 can be varied by a variable angular position control of control shaft 106, thereby performing a function of a variable compression mechanism. Shown in FIGS. 3A and 3B are examples of postures in which links 103 to 105, control shaft 106 and eccentric cam 107 are held when variable valve mechanism 100 is in a high compression ratio position and a low compression ratio position, respectively.

In the meantime, in comparison with a so-called sub-piston type variable compression mechanism disclosed by Japanese Examined Patent Publication No. 7-3201, the combustion chamber is not distorted even when a change to a low compression ratio is made, and further since there is not within the combustion chamber a projection or corner portion that is causative of hot surface ignition, thus exhibiting a relatively linear anti-knock property in accordance with a variation of compression ratio.

Herein, the compression ratio control by means of variable compression ratio mechanism 100 is basically configured to set a compression ratio on the basis of engine speed Ne and load Te (e.g., intake air quantity Qa, basic fuel injection quantity Tp, accelerator opening degree APO and throttle opening degree TVO) and control actuator (motor) 110 to change the rotational position of control shaft 106 so that the set compression ratio is attained. In the meantime, an actual compression ratio can be detected by detecting the rotational position of control shaft 106 by means of a rotary encoder or the like.

Figure 4:
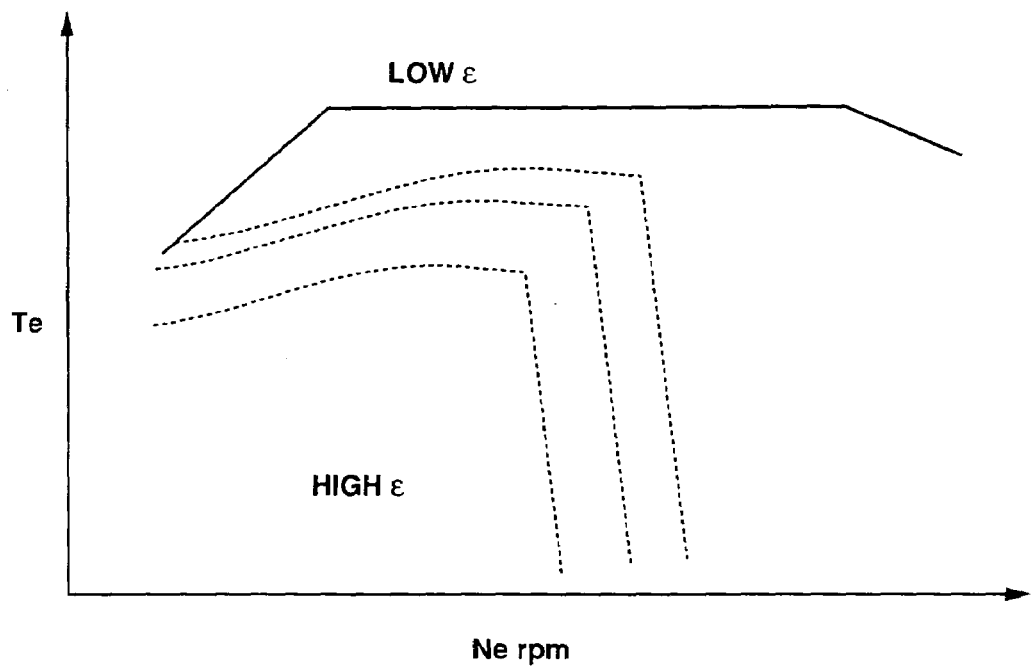
FIG. 4 is a map for setting a compression ratio.

FIG. 4 shows a map used for determining a compression ratio, in which set compression ratios ($\epsilon$) are allocated in accordance with engine speed Ne and load Te.

At low speed and low load, a high compression ratio (high $\epsilon$) is set to improve the fuel consumption. At high load, a low compression ratio (low $\epsilon$) is set to avoid knock of engine 1. Further, at high speed (i.e., when the engine speed is in a range higher than a medium speed range), a low compression ratio (low $\epsilon$) is set since the driving force of actuator 110 becomes larger by the influence of inertia (i.e., the holding energy of control shaft 106 is increased) and contribution to actual fuel consumption is rather small.

In the above-described setting of the compression ratio, one compression ratio is set by the map at the same engine operating condition (i.e., at the same engine speed and load condition). Under such a condition, an aged deterioration such as deposit in the combustion chamber may cause a possibility of deteriorating an anti-knock property.

Figure 5:
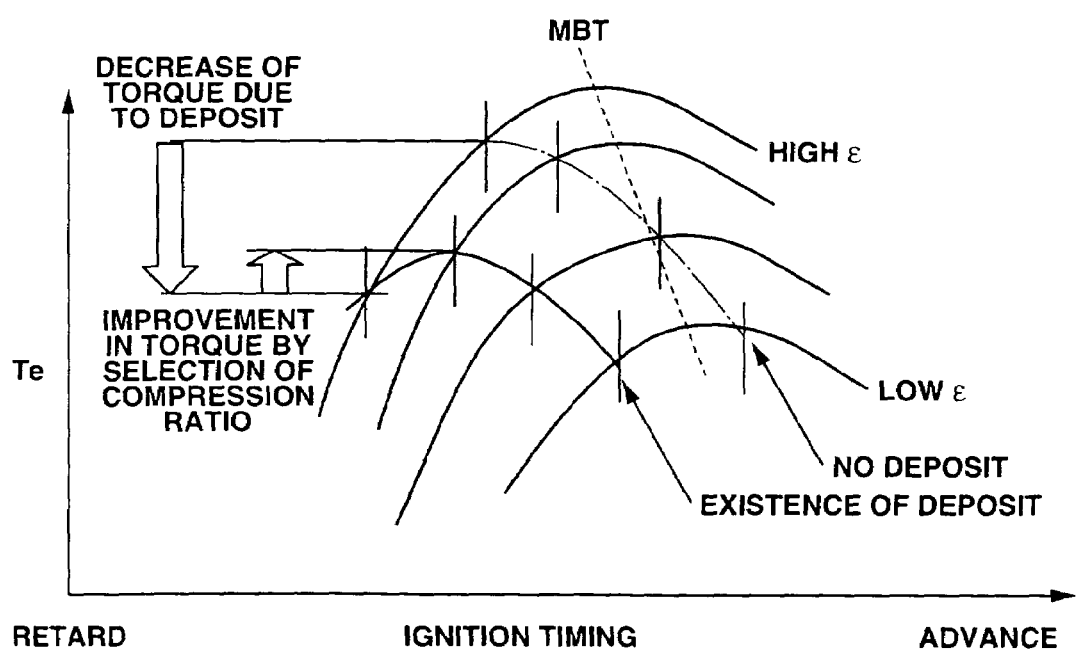
FIG. 5 is a conceptional view for illustrating a variation of required compression ratio due to an aged deterioration.

FIG. 5 is a conceptional view showing a variation in required compression ratio due to an aged deterioration.

FIG. 5 shows a variation of torque (Te) in relation to an ignition timing under the same engine operating condition (i.e., under the same engine speed and load condition), in which the compression ratios are shown in four stages from low (low $\epsilon$) to high (high $\epsilon$) conditions. Represented by vertical lines at each compression ratio are trace knock ignition timings (knock limits). When observation is made to a curve connecting the trace knock ignition timings at the respective compression ratios, a highest torque is obtained on the high compression ratio side under the condition where there is no deposit. From the point of view of the efficiency, the best efficiency is obtained under the highest compression condition. Under the condition where deposit exists, the trace ignition timing of each compression ratio moves toward the retard side, so that the compression ratio that can attain the highest torque is the second from the highest compression ratio. Accordingly, by selecting the set compression ratio in accordance with an aged deterioration (deposit formation), it becomes possible to avoid knock and suppress deterioration in the fuel consumption.

Figure 6:
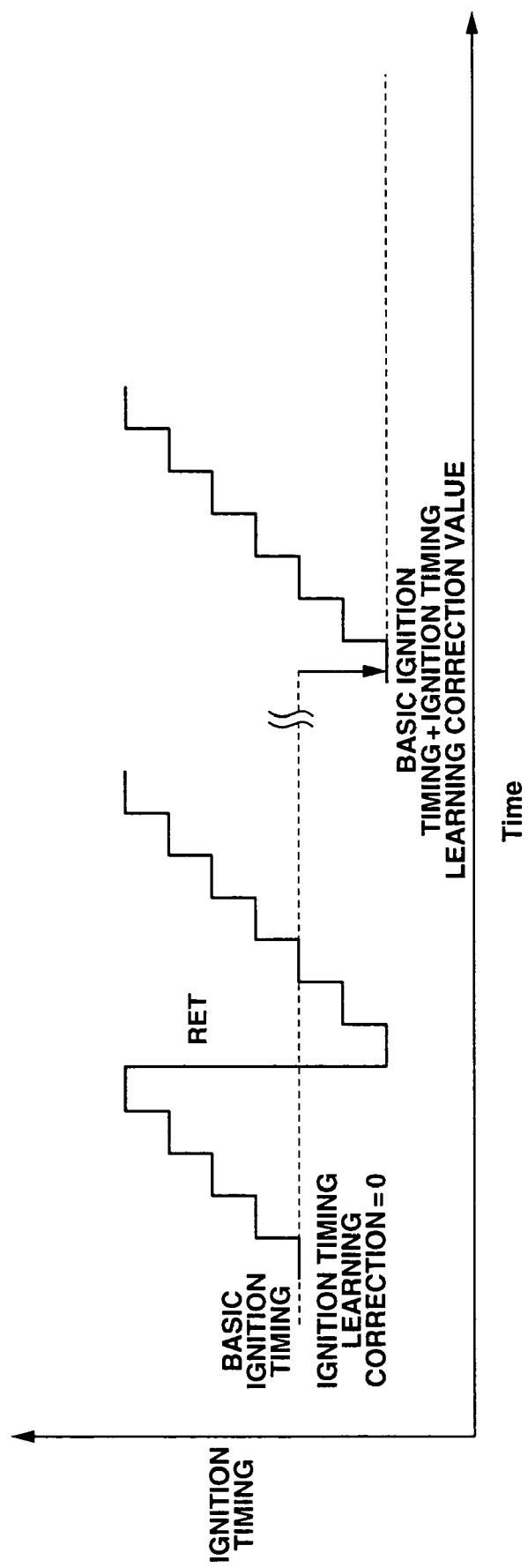
FIG. 6 is a conceptional view for illustrating an ignition timing learning correction.

As a control value representative of an aged deterioration, there is an ignition timing learning correction value. Referring to FIG. 6, the ignition timing learning correction value will be described.

FIG. 6 shows an ignition timing control in case a knock control is performed continuously under the same engine operating condition. Namely, shown in the figure is a so-called step retard method whereby the ignition timing is advanced from a basic ignition timing gradually and retarded when knock is detected. The amount of retard (RET) is calculated in accordance with the magnitude of knock (or frequency of knock) so as to increase with increase of the magnitude of knock.

The ignition timing learning correction value is a value obtained by sampling a deviation of ignition timing subjected to a knock control from a basic ignition timing for a predetermined time and averaging the deviation, whereby the basic ignition timing itself is corrected.

Figure 7:
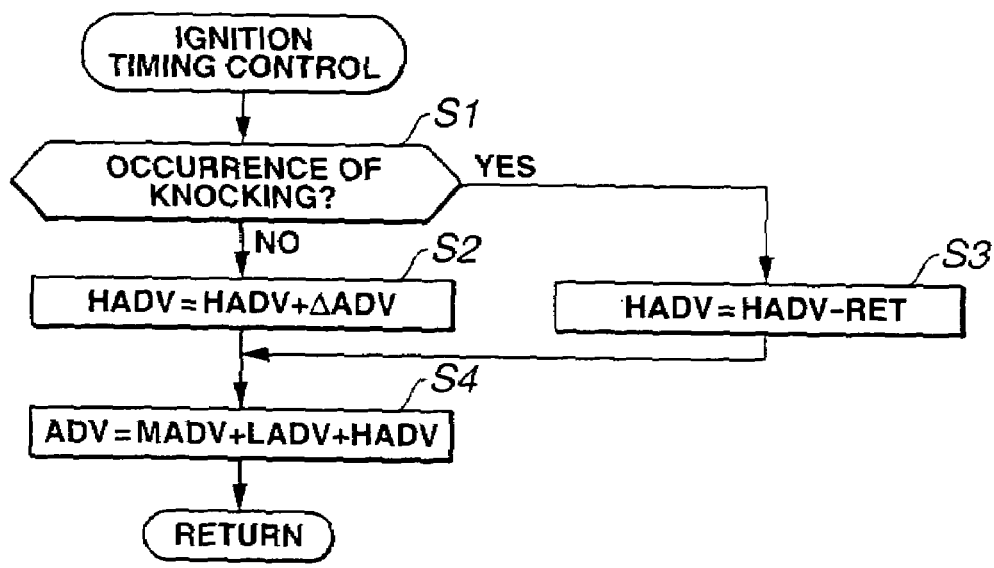
FIG. 7 is a flowchart of an ignition timing control.

Namely, as shown in the flowchart of FIG. 7, it is determined in step S1 whether the engine is knocking. When it is determined in step S1 that the engine is not knocking, the control processing goes to step S2 where a knock correction value HADV is increased toward an advance side by a small value $\Delta$ADV (HADV=HADV+$\Delta$ADV). When it is determined in step S1 that the engine is knocking, the control processing goes to step S3 where knock correction value HADV is decreased toward the retard side by a retard amount RET corresponding to the magnitude of knock (HADV=HADV−RET). Then, in step S4, basic ignition timing MADV is corrected by learning correction value LADV and knock correction value HADV to set final ignition timing ADV (ADV=LADV+HADV).

Figure 8:
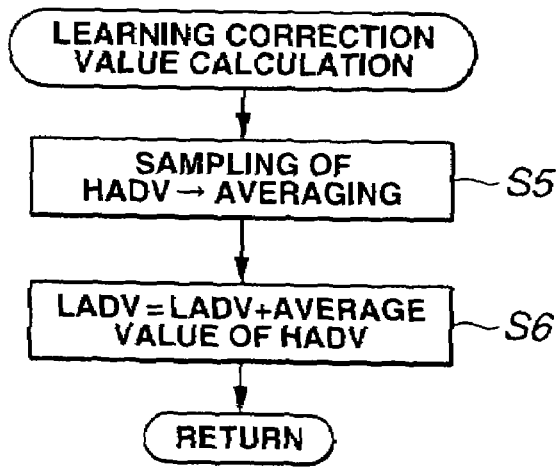
FIG. 8 is a flowchart of a learning correction value calculation.

Further, learning correction value LADV is updated in accordance with a flowchart shown in FIG. 8. Namely, in step S5, knock correction amounts HADV are sampled and averaged, and thereafter in step S6 learning correction value LADV (initial value is 0) is updated (LADV=LADV+ average of HADV) by an average of knock correction amount HADV.

Accordingly, the ignition timing learning correction value is representative of a variation of an individual engine, a change in the environment and aged deterioration with respect to a basic condition.

Thus, according to the present invention, the set compression ratio is corrected by using the ignition timing learning correction value.

Figure 9:
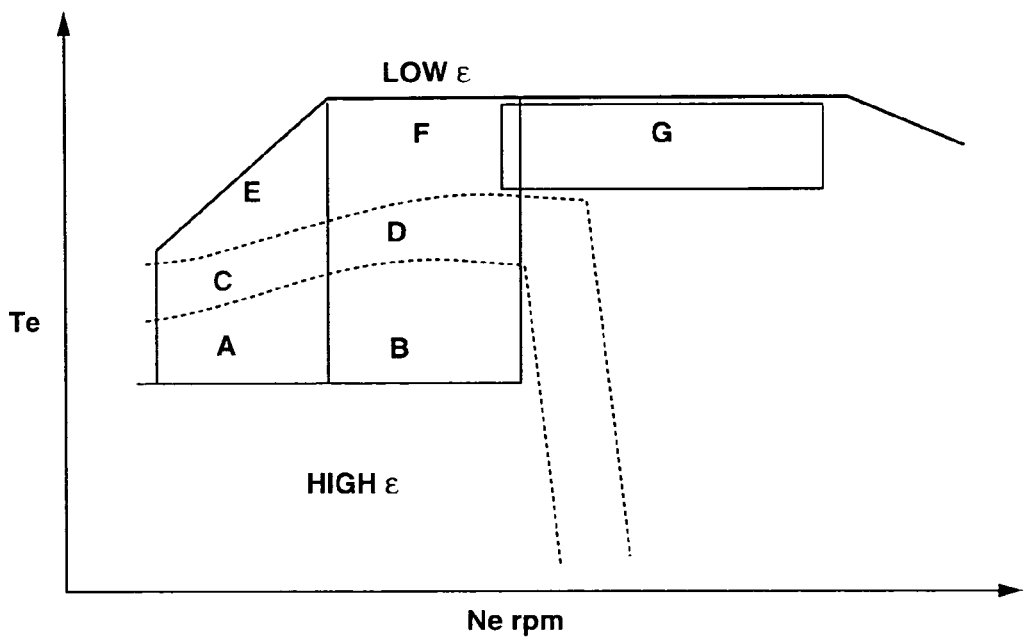
FIG. 9 is a graph showing a compression ratio learning correction range.

In FIG. 9 are shown ranges in which an ignition timing learning control is to be executed.

In the figure, indicated by A to F are ranges in which the ignition timing learning control is performed and by G is a range in which an ignition timing estimation learning is performed.

Of the ignition timing learning ranges, A, B ranges are defined so as to have an upper limit determined by the setting of compression ratio and a lower limit determined by an intake air quantity. A, B ranges are further defined by engine speed. This is for not performing the ignition timing correction control in the range where knock can be avoided even under a high compression ratio condition and for avoiding a variation in the learning value being caused by a different target compression ratio. Further, the reason why the learning range is divided by engine speed is that the turbulence intensity during combustion within the cylinder varies depending upon a variation of engine speed. Similarly, C to F are ignition timing learning ranges defined by set compression ratio and engine speed.

G is a so-called estimation learning range. This range is a high speed range in which noise of a knock sensor increases and therefore a range in which a control is performed by using an ignition timing learning correction value obtained by a knock control in a low speed range. The ignition timing learning correction value used for estimation has heretofore been an average value in each range or the like. However, since the degree of flatness of the combustion chamber, the turbulence intensity, etc. varies depending upon a variation of the set compression ratio, so that it is not always wiser to use A to F ranges. Accordingly, in this embodiment, it is determined to use only a range close to a target compression ratio in a range in which the estimation learning is performed. Namely, an ignition timing learning correction value in E, F ranges is used for determining the aged deterioration of the engine and variations in the fuel properties with respect to the standard condition thereof and used as an ignition timing learning correction value in G range.

The ignition timing learning correction value for each range is calculated and on the basis of a calculated value correction of a set compression ratio for each range is performed.

Figure 10:
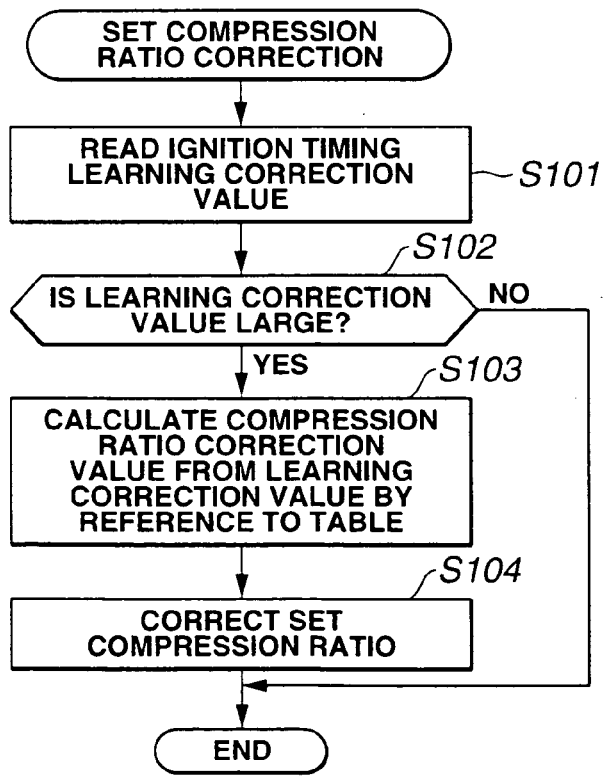
FIG. 10 is a flowchart of a set compression ratio correction according to a first embodiment of the present invention.

FIG. 10 is a flowchart for correction of a set compression ratio according to a first embodiment of the present invention, which is executed in ECU 20.

In step S101, an ignition timing learning correction value is read.

In step S102, it is determined whether or not an absolute value of the ignition timing correction value is larger than a predetermined value.

If the absolute value of the ignition timing correction value is larger than the predetermined value, the control processing goes to step S103.

In step S103, by reference to a table for determining a set compression ratio correction value in accordance with an ignition timing learning correction value, a set compression ratio correction value is determined from an ignition timing learning correction value. Herein, the set compression ratio correction value is determined so that the set compression ratio is corrected increasingly toward the low compression ratio side with increase in the ignition timing learning correction value toward the retard side (minus side).

Then, in step S104, the set compression ratio correction value is added to or subtracted from the present set compression ratio thereby correcting the set compression ratio and then the control processing is ended.

If it is determined in step S102 that the absolute value of the ignition timing correction value is smaller than the predetermined value, correction is not added to the set compression ratio and the control processing is ended.

In this manner, by correcting the set compression ratio by the ignition timing learning correction value, it becomes possible to suppress deterioration in the fuel consumption due to an aged deterioration, etc. and prevent knock of the engine.

Then, the second embodiment will be described.

The second embodiment is configured, in contrast to the first embodiment, to further correct the ignition timing learning correction value on the basis of cooling water temperature Tw representative of a warm-up condition of the engine, intake air temperature Ta representative of an environmental condition and air/fuel ratio A/F (a deviation from a target A/F and representative of a deviation of a fuel control of the engine) thereby establishing a higher correlation between the aged deterioration of the engine and the ignition timing learning correction value and performing a better compression ratio correction.

Figure 12:
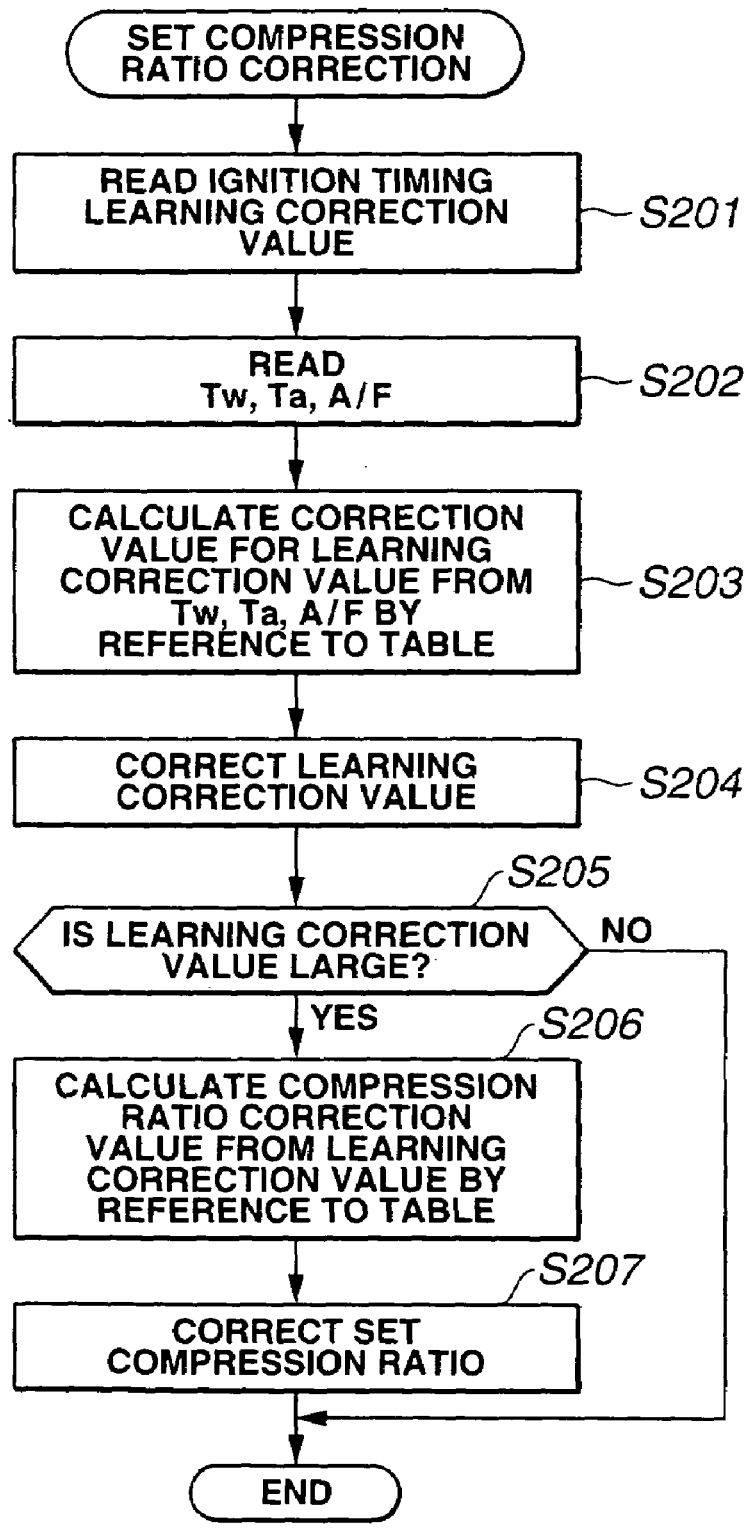
FIG. 12 is a flowchart of a set compression ratio correction according to a second embodiment.

FIG. 12 is a flowchart showing a set compression ratio correction according to the second embodiment, which is executed in ECU 20.

In step S201, an ignition timing learning correction value is read.

In step S202, cooling water temperature Tw, intake air temperature Ta and air/fuel ratio A/F are read.

Figure 13A:
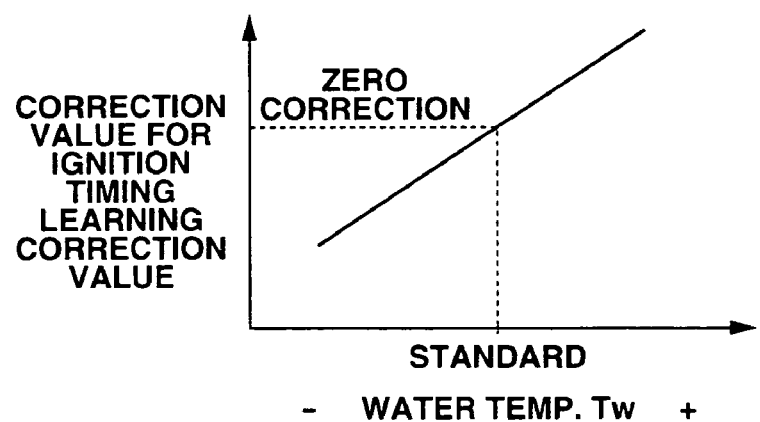
FIGS. 13A to 13C are views showing tables for determining ignition timing learning correction values in accordance with water temperature, intake air temperature and air/fuel ratio, respectively, which is used in the second embodiment.
Figure 13B:
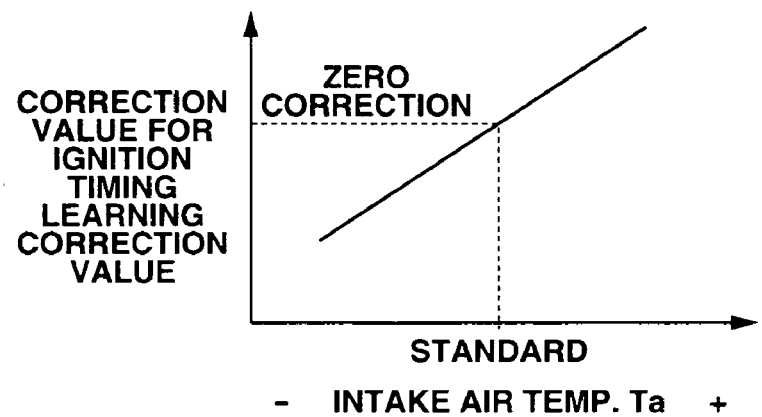
Figure 13C:
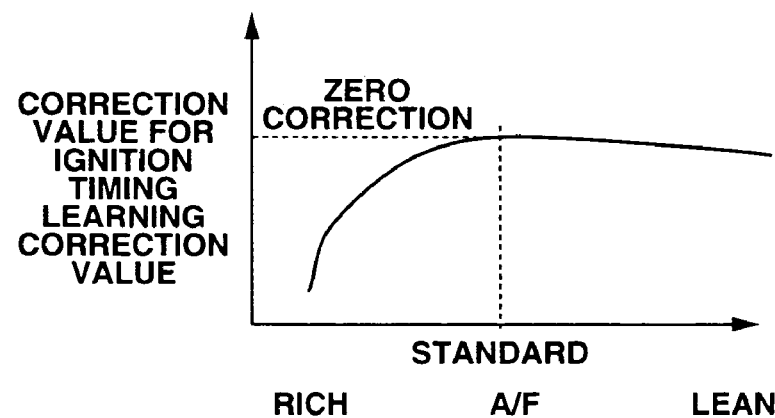

In step S203, by reference to the tables shown in FIGS. 13A to 13C, correction values for the ignition timing learning correction value are obtained from water temperature Tw, intake air temperature Ta and air/fuel ratio A/F.

In step S204, the ignition timing learning correction value read in step S201 is corrected by the correction values obtained in step S203.

In step S205, it is determined whether or not the absolute value of the ignition timing learning correction value after correction is larger than a predetermined value.

If the absolute value of the ignition timing learning correction value after correction is larger than a predetermined value, the control processing goes to step S206.

Figure 11:
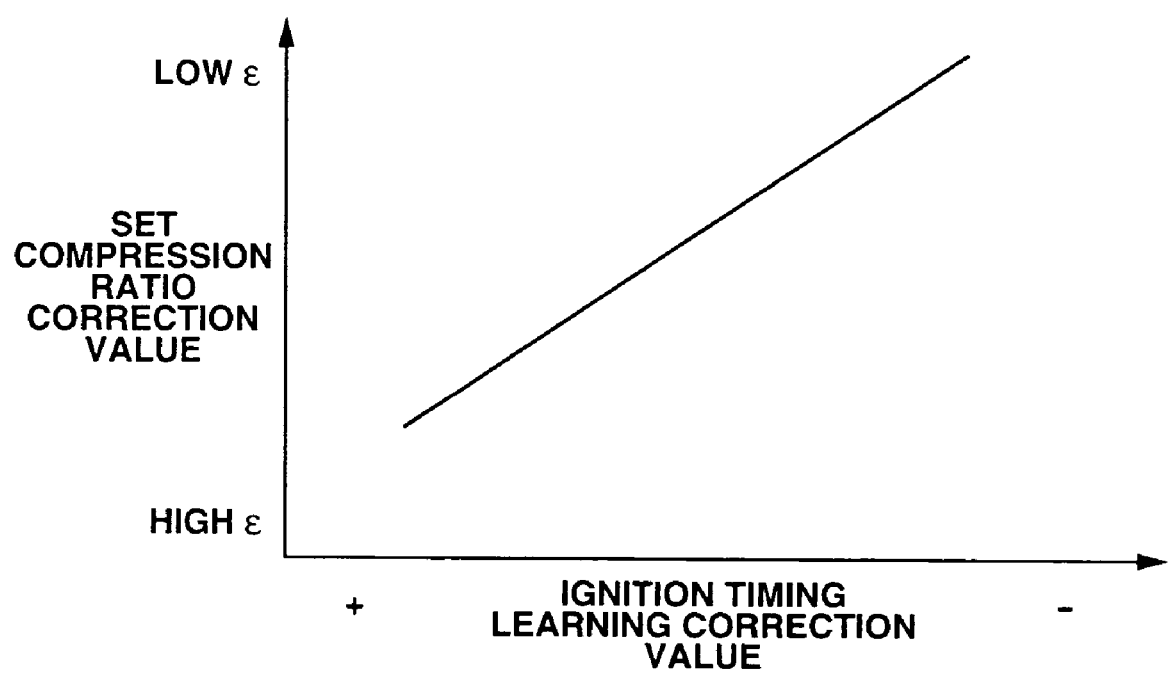
FIG. 11 is a view showing a table for determining a set compression ratio correction value in accordance with an ignition timing learning correction value, which is used in the first embodiment.

In step S206, by reference to the table of FIG. 11, a set compression ratio correction value is determined in accordance with an ignition timing learning correction value after correction.

In step S207, the set compression ratio correction value is added to the present set compression ratio thereby correcting the set compression ratio and the control processing is ended.

Herein, FIG. 13A is a graphic representation of a correction value used for further correcting the ignition timing learning correction value in accordance with cooling water temperature Tw with a view to making higher the correlation between an ignition timing learning correction value and a suitable compression ratio.

Generally, in case cooling water temperature Tw is low (i.e., at the time of cold engine or during warm-up), the cooling loss within the cylinder during combustion is increased, whereby knock is suppressed. Accordingly, for making higher the correlation between an ignition timing learning correction value and a suitable compression ratio, it is desirable to determine the set compression ratio after a temperature portion has been corrected. Accordingly, after the ignition timing learning correction value has been corrected in accordance with cooling water temperature Tw, the set compression ratio is corrected.

Similarly, FIG. 13B is a table for determining a correction value for the ignition timing learning correction value in accordance with intake air temperature Ta. In case intake air temperature Ta is low, knock is suppressed. Thus, after the ignition timing learning correction value has been corrected based on intake air temperature Ta, the set compression ratio is corrected.

Similarly, FIG. 13C shows a table for determining a correction value for the ignition timing learning correction value in accordance with air/fuel ratio A/F. In consideration of the fact that knock is suppressed more assuredly as air/fuel ratio A/F becomes richer and the sensitivity is lowered on the lean side, the set compression ratio is corrected after the ignition timing correction value is corrected in accordance with air/fuel ratio A/F. In the meantime, the air/fuel ratio can be an output voltage of a widely used $O^2$ sensor other than an actual air/fuel ratio.

By the above-described control, the more suitable compression ratio correction by further taking into account the engine warm-up condition (cooling water temperature), the environmental condition (intake air temperature) and air/fuel ratio (deviation of fuel control of engine) can be made as compared with the first embodiment.

Then, the third embodiment will be described.

The third embodiment aims at determining the more assured set compression ratio correction value by restricting the learning correction range of the compression ratio.

Figure 14:
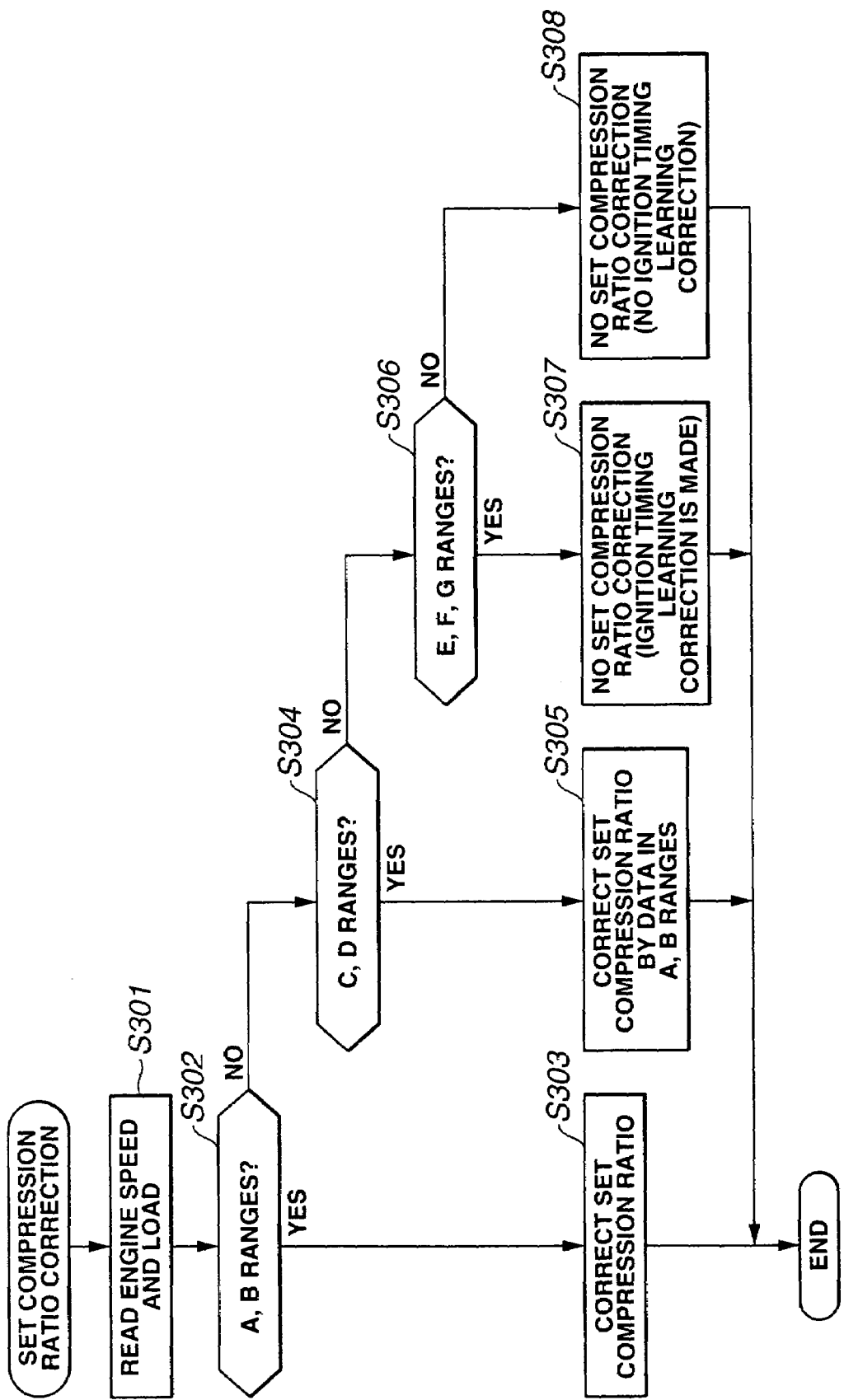
FIG. 14 is a flowchart of a set compression ratio correction according to a third embodiment of the present invention.
Figure 15:
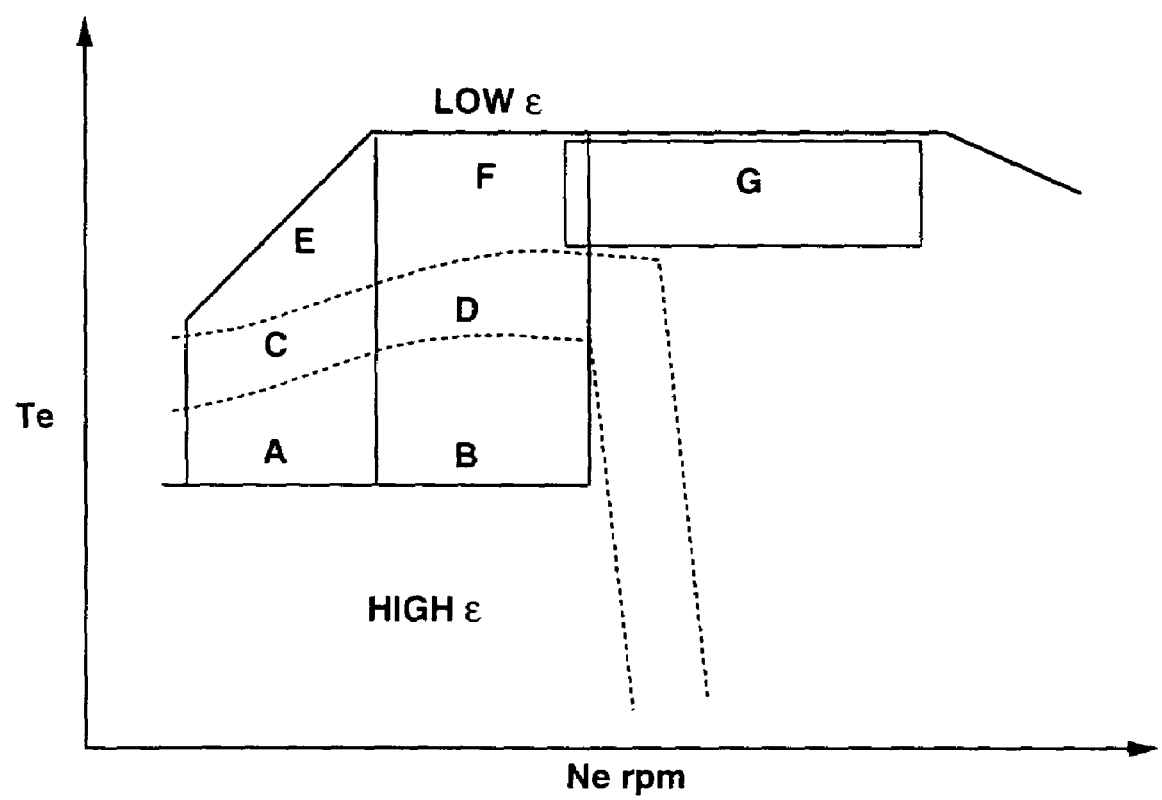
FIG. 15 is a view showing a compression ratio learning correction range in the third embodiment.

FIG. 14 is a flowchart showing a set compression ratio correction which is executed in ECU 20, and FIG. 15 is a view showing a separated condition of learning correction ranges for a compression ratio.

A, B ranges are limited to the ranges in which the set compression ratio is maximum and the engine load is relatively high. For this reason, the lower limit of the ranges is defined by the engine load (air quantity equivalent value Tp, APO, TVO or the like) and the upper limit is defined by the maximum compression ratio limit line of a basic set compression ratio map.

C, D ranges are determined at both the upper limit and the lower limit by compression ratio setting.

Further, defined as E, F ranges are high load ranges. On the high speed side of E, F ranges is defined G range.

For making clear a change due to an aged deterioration, it is desirable to limit the learning correction range to a range in which the compression ratio is constant and knock is liable to be caused at the time of occurrence of aged deterioration of the engine.

Accordingly, by limiting the learning correction range to the range in which the set compression ratio is highest, the aged deterioration of the engine can be determined more accurately.

Referring to FIG. 14, the processing flow of the set compression ratio correction will be described.

In step S301, engine speed and engine load (e.g., air quantity equivalent value Tp) are read for determination of the range.

In step S302, it is determined whether or not the engine is operating in A, B ranges. If the engine is operating in A, B ranges, the control processing goes to step S303 where the set compression ratio is corrected by the ignition timing learning correction value.

If it is determined in step S302 that the engine is not operating in A, B ranges, the control processing goes to step S304 where it is determined whether or not the engine is operating in C, D ranges. If the engine is operating in C, D ranges, the control processing goes to step S305 where the set compression ratio is corrected in accordance with the ignition timing learning correction value in A, B ranges. This is because there is a possibility of a difference between a target compression ratio and an actual compression ratio being caused in a range where the set compression ratio is varied largely, thus causing a possibility of varying the correlation between the ignition timing learning correction value and the aged deterioration of the engine.

If it is determined in step S304 that the engine is not operating in C, D ranges, the control processing goes to step S306 where it is determined whether or not the engine is operating in E, F, G ranges. If the engine is operating in E, F, G ranges, the control processing goes to step S307 where correction of the set compression ratio is not made but only the processing for reflecting the learning correction of the ignition timing is executed. Since high load is required in those ranges, the compression ratio is set low so as to suppress knock and therefore only the learning correction of the ignition timing is useful in those ranges. In the meantime, since in G range the engine speed is so high and therefore it is difficult to detect knock, so that learning of the ignition timing in G range is estimation learning by using the data in E, F ranges.

If it is determined in step S306 that the engine is not operating in E, F, G ranges, i.e., not in any of A to G ranges, the control processing goes to step S 308 where correction of the set compression ratio is not made and also learning correction of the ignition timing is not made.

By executing such a correction control, the learning correction ranges are limited, thus making it possible to determine the learning correction value of the compression more assuredly.

According to the present invention, the learning correction value of the ignition timing that is in accordance with a knock occurrence state is learned in an engine operating range defined by engine speed, engine load and set compression ratio, thus making it possible to limit the learning correction range and thereby determine the more suitable set compression ratio correction value.

Further, according to this embodiment, the learning correction value of the ignition timing is learned in accordance with a knock occurrence state and in operation ranges (A, B ranges) where the compression ratio is set at or adjacent the maximum value, whereby it becomes possible to determine the set compression ratio correction value irrespective of a deviation amount of an actual compression ratio from a target compression ratio.

Further, according to this embodiment, correction of the compression ratio is not made in operation ranges (E, F, G ranges) where the compression ratio is set at or adjacent the minimum value, whereby it becomes possible to prevent the set compression ratio from becoming higher due to erroneous determination of the ignition timing learning correction value in an operation range where the engine is required to produce a high output and thereby prevent the output from being lowered.

Further, according to this embodiment, correction of the compression ratio is not made in an operation range (G range) where the learning correction value is estimated in accordance with a knock occurrence condition in other operation ranges, whereby it becomes possible to prohibit the compression ratio learning correction in the operation range where it is difficult to detect occurrence of knock and therefore prevent the engine output from being lowered due to an erroneous judgment.

Then, learning correction of the compression ratio according to the fourth embodiment of the present invention will be described.

The fourth embodiment is configured to perform correction of the compression ratio in accordance with an operation history of the engine.

Figure 16:
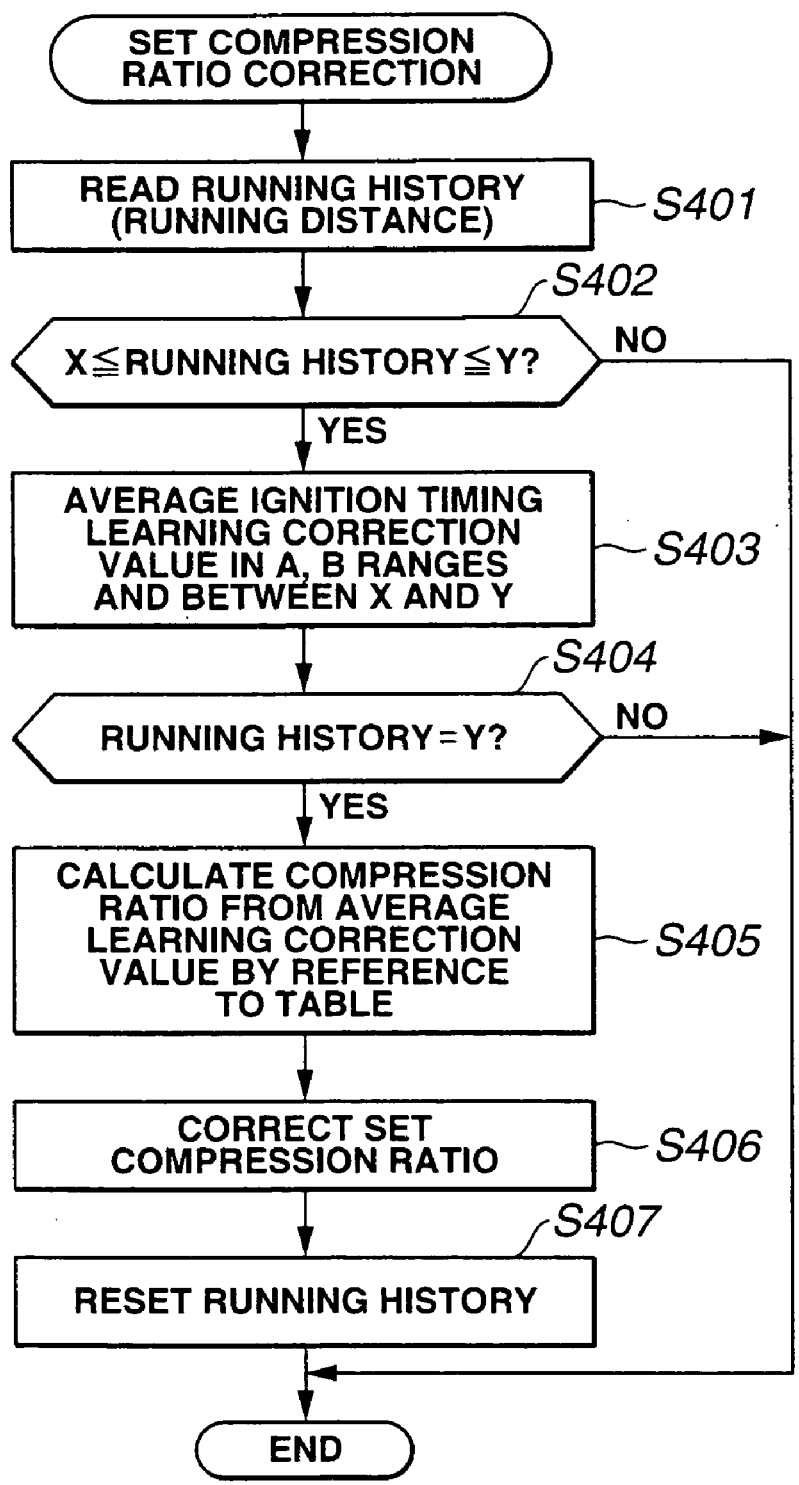
FIG. 16 is a flowchart of set compression ratio correction according to a fourth embodiment.

FIG. 16 is a flowchart of a set compression ratio correction according to the fourth embodiment, which is executed in ECU 20.

In step S401, a running distance (accumulated value or total sum) of an associated vehicle indicative of an operation history of the engine is read.

In step S402, it is determined whether or not the running distance is within a predetermined range from X (e.g., ten thousand kilometers) to Y (e.g., fifteen thousand kilometers). If the running distance is within the predetermined range, the control processing goes to step S403.

In step S403, the ignition timing learning correction values in A, B ranges shown in FIG. 15 are averaged.

In step S404, it is determined whether or not the running distance is equal to a maximum limit value of the predetermined range, i.e., equal to Y (e.g., fifteen thousand kilometers). If the answer is affirmative, the control processing goes to step S405.

In step S405, by reference to a table of FIG. 11, a set compression ratio correction value is determined based on an average ignition timing of learning correction value.

In step S406, a set compression ratio correction value is added to the present set compression ratio thereby correcting the set compression ratio.

In step S407, a running history (running distance) is reset and the control processing is ended.

According to the present invention, the learning correction value of the ignition timing is learned within a period of time corresponding to a predetermined operation history of the engine, and correction of the compression ratio is made in accordance with the learning correction value after the period of time corresponding to the predetermined operation history, whereby an erroneous judgment on the aged deterioration of the engine can be suppressed and it becomes possible to correct the compression ratio in accordance with the aged deterioration of the engine more assuredly.

The entire contents of Japanese Patent Applications P2003-323093 (filed Sep. 16, 2003) are incorporated herein by reference.

Although the invention has been described above by reference to certain embodiments of the invention, the invention is not limited to the embodiments described above. Modifications and variations of the embodiment described above will occur to those skilled in the art, in light of the above teachings. The scope of the invention is defined with reference to the following claims.

What is claimed is:

1. A control apparatus for an internal combustion engine comprising:
   a variable compression ratio mechanism capable of varying a compression ratio of the engine;
   a knock sensor for detecting a knock occurrence state; and
   a controller for controlling the compression ratio and an ignition timing of the engine;
   the controller including:
      a compression ratio setting section that sets a compression ratio to be attained by the variable compression ratio mechanism in accordance with an operating condition of the engine;
      an ignition timing learning correcting section that determines a learning correction value of an ignition timing in accordance with the knock occurrence state; and
      a compression ratio correcting section that corrects the compression ratio set by the compression ratio setting section in accordance with the learning correction value of the ignition timing.

2. A control apparatus according to claim 1, wherein the compression ratio correcting section is configured to correct the compression ratio set by the compression ratio setting section in accordance with at least one of a warm-up condition, an environmental condition and an air/fuel ratio, in addition to the learning correction value of the ignition timing.

3. A control apparatus according to claim 1, wherein the compression ratio correcting section is configured to learn the learning correction value of the ignition timing that is determined in accordance with the knock occurrence state in an operating range determined by engine speed, engine load and the set compression ratio.

4. A control apparatus according to claim 1, wherein the compression ratio correcting section is configured to learn the learning correction value of the ignition timing that is determined in accordance with the knock occurrence state in an operating range that is set at or adjacent a maximum compression ratio.

5. A control apparatus according to claim 1, wherein the compression ratio correcting section is configured so as not to correct the compression ratio in an operating range in which the compression ratio is set at or adjacent a minimum value.

6. A control apparatus according to claim 1, wherein the compression ratio correcting section is configured so as not to correct the compression ratio in an operating range in which the learning correction value of the ignition timing is estimated in accordance with the knock occurrence state in other engine operating ranges.

7. A control apparatus according to claim 1, wherein the compression ratio correcting section is configured to learn the learning correction value of the ignition timing within a period of time corresponding to a predetermined operation history of the engine and correct the compression ratio in accordance with the learning correction value after the period of time corresponding to the predetermined operation history.

8. A control apparatus according to claim 1, wherein the ignition timing learning correction section is adapted to gradually advance ignition timing from a basic ignition timing followed by a retard of ignition timing when knock is detected.

9. A control apparatus according to claim 8, wherein the control apparatus is adapted to calculate an amount of retard of ignition timing in accordance with at least one of a magnitude of knock and frequency of knock so as to increase retard with increase of at least one of magnitude and frequency, respectively, of knock.

10. A control apparatus according to claim 1, wherein control apparatus is adapted to determine the ignition timing learning correction value by sampling a deviation of ignition timing subjected to a knock control from a basic ignition timing for a predetermined time, average the deviation, and correct the basic ignition timing.

11. A control apparatus according to claim 1, wherein the control apparatus is adapted to adjust the compression ratio at low engine load.

12. A control apparatus for an internal combustion engine comprising a variable compression ratio mechanism capable of varying a compression ratio of the engine, compression ratio setting means for setting a compression ratio to be attained by the variable compression ratio mechanism in accordance with an operating condition of the engine, knock detecting means for detecting a knock occurrence state, and ignition timing learning correcting means for determining a learning correction value of an ignition timing in accordance with the knock occurrence state, the control apparatus further comprising compression ratio correcting means for correcting the compression ratio set by the compression ratio setting means in accordance with the learning correction value of the ignition timing.

13. A control method for an internal combustion engine having a variable compression ratio mechanism capable of varying a compression ratio of the engine, comprising:
   setting a compression ratio to be attained by the variable compression ratio mechanism in accordance with an operating condition of the engine;
   detecting a knock occurrence state;
   determining a learning correction value of an ignition timing in accordance with the knock occurrence state; and
   correcting the compression ratio set by the compression ratio setting section in accordance with the learning correction value of the ignition timing.

14. A control method according to claim 13, wherein the action of correcting comprises correcting the compression ratio set by the compression ratio setting section in accordance with at least one of a warm-up condition, an environmental condition and an air/fuel ratio, in addition to the learning correction value of the ignition timing.

15. A control method according to claim 13, wherein the action of correcting comprises learning the learning correction value of the ignition timing that is determined in accordance with the knock occurrence state in an operating range determined by engine speed, engine load and the set compression ratio.

16. A control apparatus according to claim 13, wherein the action of correcting comprises learning the learning correction value of the ignition timing that is determined in accordance with the knock occurrence state in an operating range that is set at or adjacent a maximum compression ratio.

17. A control method according to claim 13, wherein the action of correcting comprises not correcting the compression ratio in an operating range in which the compression ratio is set at or adjacent a minimum value.

18. A control method according to claim 13, wherein the action of correcting comprises not correcting the compression ratio in an operating range in which the learning correction value of the ignition timing is estimated in accordance with a knock occurrence state in other operating ranges.

19. A control method according to claim 13, wherein the action of correcting comprises learning the learning correction value of the ignition timing within a period of time corresponding to a predetermined operation history of the engine and correct the compression ratio in accordance with the learning correction value after the period of time corresponding the predetermined operation history.

20. The method of claim 13, further comprising gradually advancing ignition timing from a basic ignition timing, followed by retarding ignition timing when knock is detected.

21. The method of claim 20, further comprising calculating an amount of retard of ignition timing in accordance with at least one of a magnitude of knock and frequency of knock, and increasing retard with an increase of at least one of magnitude and frequency, respectively, of knock.

22. The method of claim 13, further comprising determining the ignition timing learning correction value by sampling a deviation of ignition timing subjected to a knock control from a basic ignition timing for a predetermined time, averaging the deviation, and correcting the basic ignition timing.

23. The method of claim 13, further comprising adjusting the compression ratio at low engine load.

* * * * *